United States Patent
Coin et al.

[15] 3,681,546
[45] Aug. 1, 1972

[54] LEVEL DETECTOR

[72] Inventors: Rene Georges Coin, St. Pol S/Mer; Robert-Justin Croo, DunkirK; Pierre Henri Meuret, St. Pol S/Mer, all of France

[73] Assignee: The British Petroleum Company Limited, London, England

[22] Filed: Dec. 23, 1970

[21] Appl. No.: 100,962

[30] Foreign Application Priority Data

Dec. 23, 1969 France..................6944543

[52] U.S. Cl....................200/81 R, 137/82, 137/386, 200/83 R, 73/302
[51] Int. Cl............................H01h 35/32
[58] Field of Search.....200/81 R, 83 R; 137/82, 386, 137/403; 251/61; 73/299, 302

[56] References Cited

UNITED STATES PATENTS

| | | |
|---|---|---|
| 2,988,099 | 7/1961 | Langhans..................137/82 |
| 3,006,595 | 10/1961 | Rosebrook.................137/82 X |
| 2,910,999 | 11/1959 | Kimberly....................137/386 |
| 2,833,411 | 5/1958 | Bosman et al............137/403 X |
| 3,058,672 | 10/1962 | Zabel........................137/403 X |
| 3,200,971 | 8/1965 | Trethewey................137/403 X |
| 3,181,556 | 5/1965 | Baker.......................200/81 R X |

Primary Examiner—Robert K. Schaefer
Assistant Examiner—Robert A. Vanderhye
Attorney—Morgan, Finnegan, Durham & Pine

[57] ABSTRACT

A pneumatic level detector has a probe connected to a pneumatic amplifier, the output of which is supplied to a pneumatic relay. When a liquid reaches the level of the probe it blocks the probe and the consequential rise of pressure is amplified so that the pneumatic relay is activated. The relay may operate an electric Switch.

4 Claims, 1 Drawing Figure

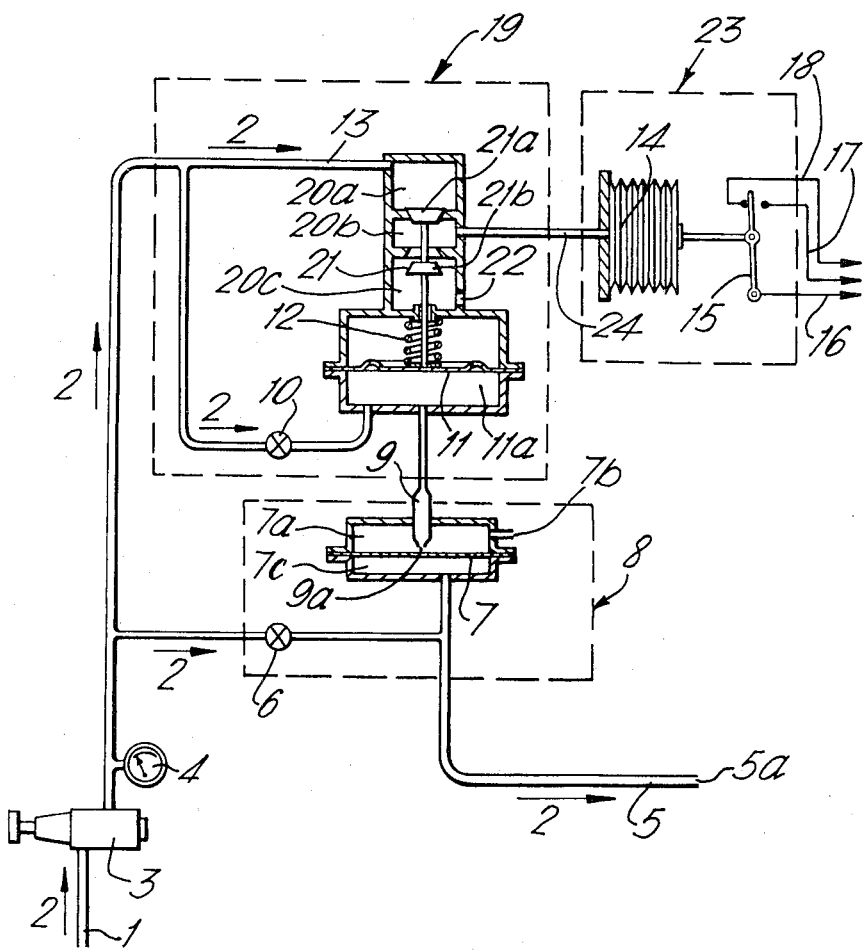

LEVEL DETECTOR

This invention relates to a level detector.

One knows the drawbacks of insufficient sensitivity of the level detectors usually employed for the current applications, whether these detectors are of the ultrasonic type or whether they are based on a variation of capacitance or whether they make use of thermistors.

Furthermore it is known that ultrasonic detectors cannot be used to detect the levels of foam.

As regards capacitive detectors, they are not suitable for detecting the levels of viscous liquids.

On the other hand, detectors with thermistors cannot be used when one is dealing with products with a low flash point.

The present invention relates to a particularly robust pneumatic detector which offers good qualities of safety and sensitivity, and supplies indications which are independent of variations in temperature.

Such pneumatic detectors possess numerous applications including the detection of levels in most tanks and manufacturing units operating at atmospheric pressure, e.g., to avoid the overflowing of products when filling storage tanks or road or railway tankers and to measure volumes when filling certain laboratory or industrial appliances.

Accordingly the invention consists in a pneumatic level detector in which the input side of a pneumatic amplifier is connected to a probe tube so as to amplify the increase in pressure which occurs when the opening of the probe tube is blocked and the output side of the pneumatic amplifier is connected to the primary of a pneumatic relay the secondary of which:

a. vents an outlet to atmosphere when the primary receives a low pressure, and
b. connects the outlet to an inlet adapted for connection to a source of gas at high pressure when the primary receives the high pressure.

Preferably the pneumatic amplifier comprises a spring membrane which separates an input chamber connected to the probe from a vented output chamber connected to the primary of the pneumatic relay, the connection terminating in a nozzle close to the membrane whereby an increase in pressure in the input chamber causes the membrane to move towards the nozzle thereby restricting flow and hence passing an amplified rise of pressure to the pneumatic relay.

Preferably the pneumatic relay comprises an outlet chamber connected to an adjacent chamber via an inlet valve and to a vent chamber via a vent valve, the inlet valve and the vent valve having a common actuator arranged so that when one is shut the other is open, the actuator being operatively connected to the output of the amplifier so as to close the vent valve and open the inlet valve when the amplifier provides a high pressure.

The invention will now be described by way of example with reference to the drawing which is a diagrammatic cross section of a level detector according to the invention.

As shown in the drawing an air supply is provided by a pipe 1, the air travelling in the direction of the arrows 2 and passing first of all through a reducing valve 3 connected to a pressure gauge 4. The reducing valve is preferably adjusted so as to obtain a pressure of 1 bar as indicated by the pressure gauge 4.

The opening 5a of the probe 5 is arranged at the level (of solid, liquid or foam) to be detected and detection corresponds to the blocking of the opening.

A portion of the air arrives at the opening 5a via the pipe 1 and a needle valve 6. When the level to be detected is reached, a slight over-pressure appears in the input chamber 7c underneath the spring membrane 7 of the pneumatic amplifier 8. This brings about the lifting of the spring membrane 7.

There is a continuous flow of air through the output chamber 7a. This flow is received via a valve 10, the primary of a pneumatic relay 19 and a line 9 which ends in a nozzle 9a adjacent to the spring membrane 7. The flow leaves via a vent 7b.

When the spring membrane 7 lifts, the nozzle 9a is (wholly or partially) blocked and therefore the pressure rises in the chamber 11a. This lifts a diaphragm 11 against a spring 12 thereby opening an inlet valve 21a between an inlet chamber 20a and an outlet chamber 20b. Thus air from the pipe 1, which enters the inlet chamber 20a by the pipe 13, passes into a bellows 14 of a pneumatic switch 23. The bellows 14 moves the contact arm 15 to connect the conductor 16 to the conductor 17 instead of 18 (these conductors are connected to a suitable visual or acoustic indicator not shown in the drawing.)

When the open end of the probe tube becomes unblocked the spring membrane 7 moves away from the nozzle 9a so that the pressure in the chamber 11a is discharged via the vent 7b. Thus the diaphragm 11 falls closing the inlet valve 21a and opening the vent valve 21b so that the air in the bellows 14 escapes via the outlet line 24, the vent chamber 20b and the vent 22. This restores the contact arm 15 to its original position.

The sensitivity of the detector just described is such that a simple soap bubble maintained at the end of the injection tube is capable of maintaining the pneumatic relay in the inverted position and the bursting of the bubble returns it to its original position. The pressure in the bellows 14 varies between about 0.2 bars and 1 bar.

We claim:

1. A pneumatic level detector which comprises a pneumatic amplifier having an input side and an output side, a probe tube which is connected to the input side of the pneumatic amplifier so that the pneumatic amplifier amplifies the increase in pressure which occurs when the opening of the probe tube is blocked and a pneumatic relay having a primary which is connected to the output of the pneumatic amplifier and a secondary which includes a vent and an outlet which is connected to the vent when the primary receives a low pressure and the secondary also includes an inlet adapted for connection to a source of gas at high pressure which is connected to the outlet when the primary receives a high pressure.

2. A level detector according to claim 1, in which the pneumatic amplifier comprises a spring membrane which separates an input chamber connected to the probe from a vented output chamber connected to the primary of the pneumatic relay, the connection terminating in a nozzle close to the membrane, whereby an increase in pressure in the input chamber causes the membrane to move towards the nozzle thereby restricting flow and hence passing an amplified rise of pressure to the pneumatic relay.

3. A level detector according to claim 2, in which the secondary of the pneumatic relay comprises an outlet chamber connected to an adjacent inlet chamber via an inlet valve and to a vent chamber via a vent valve, the inlet valve and the vent valve having a common actuator arranged so that when one is shut the other is open, the actuator being operatively connected to the output of the amplifier so as to close the vent valve and open the inlet valve when the amplifier provides a high pressure.

4. A level detector according to claim 3, in which the pneumatic relay is operatively connected to an electric switch.

* * * * *